United States Patent
Bestler

(10) Patent No.: US 7,552,298 B2
(45) Date of Patent: Jun. 23, 2009

(54) METHOD AND SYSTEM FOR DEFERRED PINNING OF HOST MEMORY FOR STATEFUL NETWORK INTERFACES

(75) Inventor: Caitlin Bestler, Laguna Hills, CA (US)

(73) Assignee: Broadcom Corporation, Irvine, CA (US)

( * ) Notice: Subject to any disclaimer, the term of this patent is extended or adjusted under 35 U.S.C. 154(b) by 454 days.

(21) Appl. No.: 11/536,341

(22) Filed: Sep. 28, 2006

(65) Prior Publication Data

US 2008/0082696 A1 Apr. 3, 2008

(51) Int. Cl.
*G06F 12/00* (2006.01)

(52) U.S. Cl. ..................................................... 711/163

(58) Field of Classification Search ........................ None
See application file for complete search history.

(56) References Cited

U.S. PATENT DOCUMENTS 7,058,772 B2 * 6/2006 Kuwabara et al. ........... 711/159
7,308,544 B2 * 12/2007 Kuwabara et al. ........... 711/154

* cited by examiner

*Primary Examiner*—Brian R Peugh
(74) *Attorney, Agent, or Firm*—McAndrews, Held & Malloy, Ltd.

(57) ABSTRACT

Certain aspects of a method and system for deferred pinning of host memory for stateful network interfaces are disclosed. Aspects of a method may include dynamically pinning by a convergence network interface controller (CNIC), at least one of a plurality of memory pages. At least one of: a hypervisor and a guest operating system (GOS) may be prevented from swapping at least one of the dynamically pinned plurality of memory pages.

22 Claims, 13 Drawing Sheets

METHOD AND SYSTEM FOR DEFERRED PINNING OF HOST MEMORY FOR STATEFUL NETWORK INTERFACES

CROSS-REFERENCE TO RELATED APPLICATIONS/INCORPORATION BY REFERENCE

None

FIELD OF THE INVENTION

Certain embodiments of the invention relate to converged network interfaces. More specifically, certain embodiments of the invention relate to a method and system for deferred pinning of host memory for stateful network interfaces.

BACKGROUND OF THE INVENTION

The emergence of converged network interface controllers (CNICs) have provided accelerated client/server, clustering, and storage networking, and have enabled the use of unified TCP/IP Ethernet communications. The breadth and importance of server applications that may benefit from CNIC capabilities, together with the emergence of server operating systems interfaces enabling highly integrated network acceleration capabilities, may make CNICs a standard feature of volume server configurations.

The deployment of CNICs may provide improved application performance, scalability and server cost of ownership. The unified Ethernet network architecture enabled by CNIC may be non-disruptive to existing networking and server infrastructure, and may provide significantly better performance at reduced cost alternatives. A server I/O bottleneck may significantly impact data center application performance and scalability. The network bandwidth and traffic loads for client/server, clustering and storage traffic have outpaced and may continue to consistently outpace CPU performance increases and may result in a growing mismatch of capabilities.

A common solution to this challenge has been to use different networking technologies optimized for specific server traffic types, for example, Ethernet for client/server communications and file-based storage, Fibre Channel for block-based storage, and special purpose low latency protocols for server clustering. However, such an approach may have acquisition and operational cost difficulties, may be disruptive to existing applications, and may inhibit migration to newer server system topologies, such as blade servers and virtualized server systems.

One emerging approach focuses on evolving ubiquitous Gigabit Ethernet (GbE) TCP/IP networking to address the requirements of client/server, clustering and storage communications through deployment of a unified Ethernet communications fabric. Such a network architecture may be non-disruptive to existing data center infrastructure and may provide significantly better performance at a fraction of the cost. At the root of the emergence of unified Ethernet data center communications is the coming together of three networking technology trends: TCP offload engine (TOE), remote direct memory access (RDMA) over TCP, and iSCSI.

TOE refers to the TCP/IP protocol stack being offloaded to a dedicated controller in order to reduce TCP/IP processing overhead in servers equipped with standard Gigabit network interface controllers (NICs). RDMA is a technology that allows a network interface controller (NIC), under the control of the application, to communicate data directly to and from application memory, thereby removing the need for data copying and enabling support for low-latency communications, such as clustering and storage communications. ISCSI is designed to enable end-to-end block storage networking over TCP/IP Gigabit networks. ISCSI is a transport protocol for SCSI that operates on top of TCP through encapsulation of SCSI commands in a TCP data stream. ISCSI is emerging as an alternative to parallel SCSI or Fibre Channel within the data center as a block I/O transport for a range of applications including SAN/NAS consolidation, messaging, database, and high performance computing. The specific performance benefits provided by TCP/IP, RDMA, and iSCSI offload may depend upon the nature of application network I/O and location of its performance bottlenecks. Among networking I/O characteristics, average transaction size and throughput and latency sensitivity may play an important role in determining the value TOE and RDMA bring to a specific application.

A focus of emerging CNIC products may be to integrate the hardware and software components of IP protocol suite offload. The CNICs may allow data center administrators to maximize the value of available server resources by allowing servers to share GbE network ports for different types of traffic, by removing network overhead, by simplifying existing cabling and by facilitating infusion of server and network technology upgrades. The CNICs may allow full overhead of network I/O processing to be removed from the server compared to existing GbE NICs. The aggregation of networking, storage, and clustering I/O offload into the CNIC function may remove network overhead and may significantly increase effective network I/O.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

A method and/or system for deferred pinning of host memory for stateful network interfaces, substantially as shown in and/or described in connection with at least one of the figures, as set forth more completely in the claims.

These and other advantages, aspects and novel features of the present invention, as well as details of an illustrated embodiment thereof, will be more fully understood from the following description and drawings.

DETAILED DESCRIPTION OF THE INVENTION

Certain embodiments of the invention may be found in a method and system for deferred pinning of host memory for stateful network interfaces. Aspects of the method and system may comprise dynamically pinning by a convergence network interface controller (CNIC), at least one of a plurality of memory pages. At least one of: a hypervisor and a guest operating system (GOS) may be prevented from swapping at least one of the dynamically pinned plurality of memory pages. A dynamic memory region managed by a CNIC may be allocated within at least one virtual input/output memory map. At least a portion of a plurality of memory pages may be dynamically pinned and mapped based on at least one received work request. The hypervisor and the guest operating system (GOS) may be prevented from swapping the portion of the plurality of memory pages within the allocated dynamic memory region.

Figure 1A:
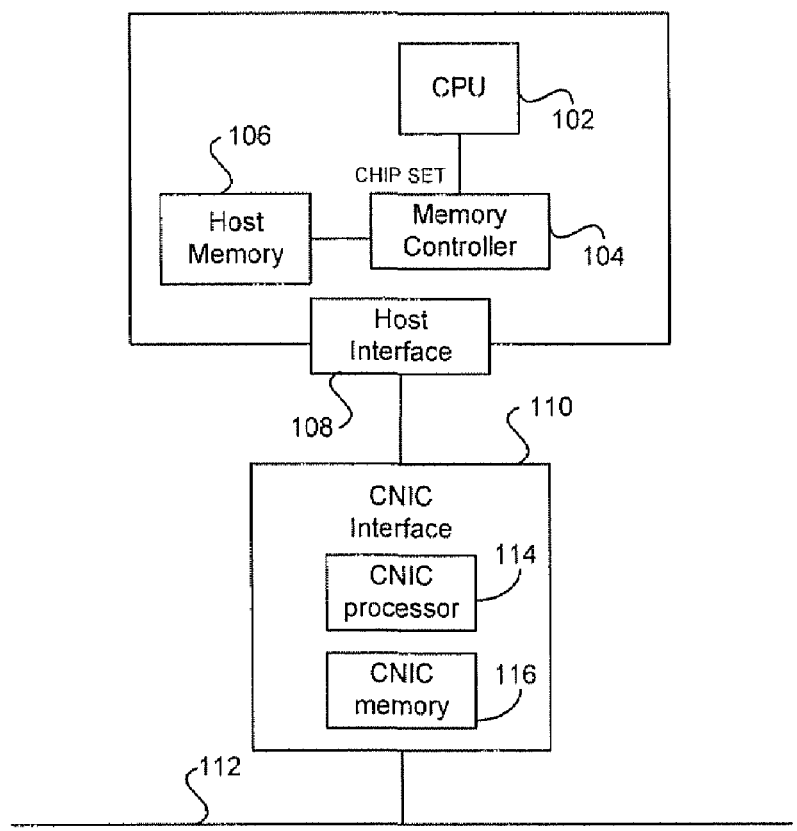
FIG. 1A is a block diagram of an exemplary system with a CNIC interface that may be utilized in connection with an embodiment of the invention.

FIG. 1A is a block diagram of an exemplary system with a CNIC interface, in accordance with an embodiment of the invention. Referring to FIG. 1A, the system may comprise, for example, a CPU 102, a memory controller 104, a host memory 106, a host interface 108, CNIC interface 110 and an Ethernet bus 112. The CNIC interface 110 may comprise a CNIC processor 114 and CNIC memory 116. The host interface 108 may be, for example, a peripheral component interconnect (PCI), PCI-X, PCI-Express, ISA, SCSI or other type of bus. The memory controller 106 may be coupled to the CPU 104, to the memory 106 and to the host interface 108. The host interface 108 may be coupled to the CNIC interface 110. The CNIC interface 110 may communicate with an external network via a wired and/or a wireless connection, for example. The wireless connection may be a wireless local area network (WLAN) connection as supported by the IEEE 802.11 standards, for example.

Figure 1B:
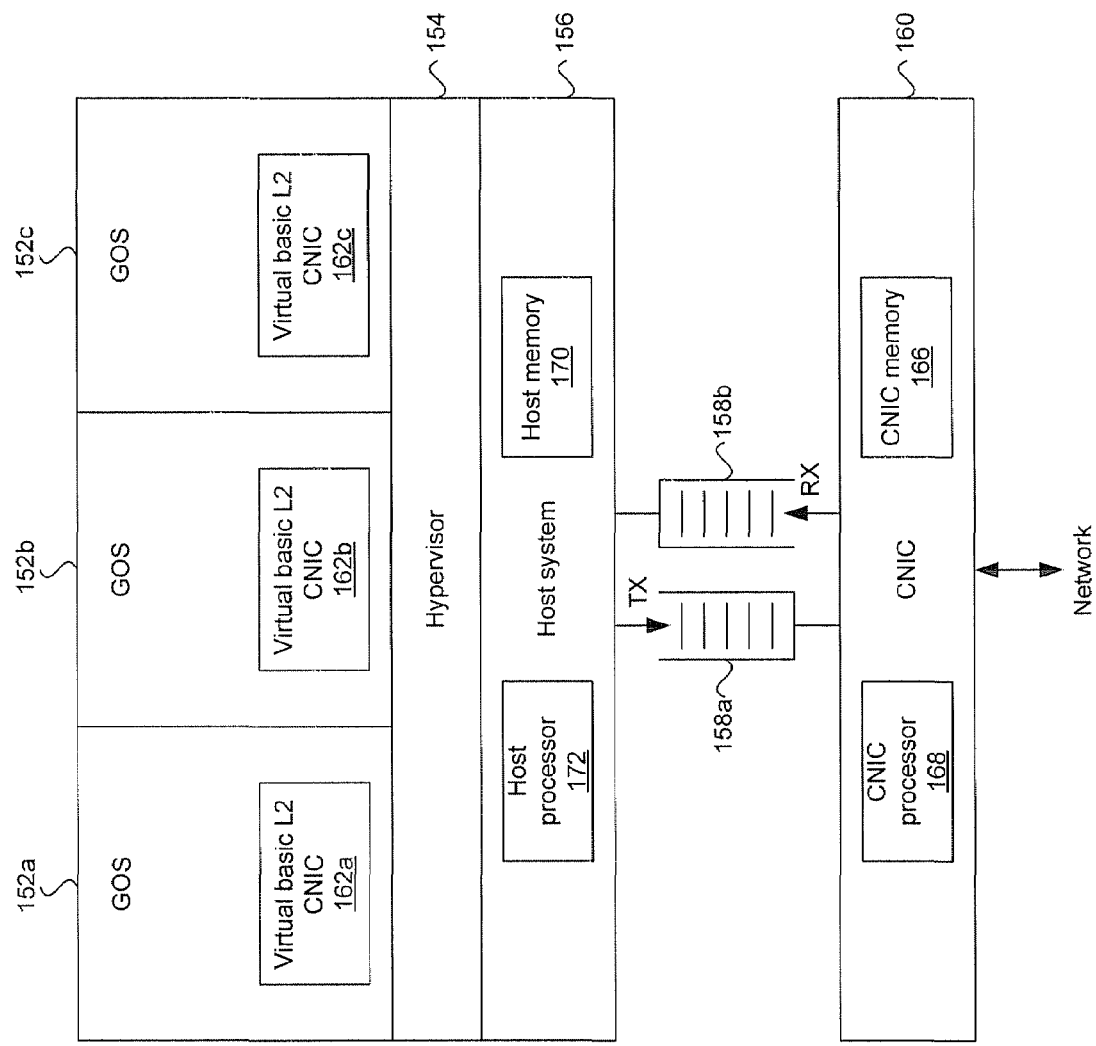
FIG. 1B is a block diagram of a CNIC communicatively coupled a host system that supports a plurality of guest operating systems (GOSs) that may be utilized in connection with an embodiment of the invention.

FIG. 1B is a block diagram of a CNIC communicatively coupled a host system that supports a plurality of guest operating systems (GOSs) that may be utilized in connection with an embodiment of the invention. Referring to FIG. 1B, there is shown a first GOS 152a, a second GOS 152b, a third GOS 152c, a hypervisor 154, a host system 156, a transmit (TX) queue 158a, a receive (RX) queue 158b, and a CNIC 160. The CNIC 160 may comprise a CNIC processor 168 and a CNIC memory 166. The host system 156 may comprise a host processor 172 and a host memory 170.

The host system 156 may comprise suitable logic, circuitry, and/or code that may enable data processing and/or networking operations, for example. In some instances, the host system 156 may also comprise other hardware resources such as a graphics card and/or a peripheral sound card, for example. The host system 156 may support the operation of the first GOS 152a, the second GOS 152b, and the third GOS 152c via the hypervisor 154. The number of GOSs that may be supported by the host system 156 by utilizing the hypervisor 154 need not be limited to the exemplary embodiment described in FIG. 1B. For example, two or more GOSs may be supported by the host system 156.

The hypervisor 154 may operate as a software layer that may enable OS virtualization of hardware resources in the host system 156 and/or virtualization of hardware resources communicatively coupled to the host system 156, such as the CNIC 160, for example. The hypervisor 154 may also enable data communication between the GOSs and hardware resources in the host system 156 and/or hardware resources communicatively connected to the host system 156. For example, the hypervisor 154 may enable packet communication between GOSs supported by the host system 156 and the CNIC 160 via the TX queue 158a and/or the RX queue 158b.

The host processor 172 may comprise suitable logic, circuitry, and/or code that may enable control and/or management of the data processing and/or networking operations associated with the host system 156. The host memory 170 may comprise suitable logic, circuitry, and/or code that may enable storage of data utilized by the host system 156. The hypervisor 154 may be enabled to control the pages that may be accessed by each GOS. The hypervisor 154 may be enabled to support GOS creation of per-process virtual memory maps. The hypervisor 154 may enable inter-partition communication by copying data from between partitions and/or mapping certain pages for access by both a producer and a consumer partition.

The host memory 170 may be partitioned into a plurality of memory regions or portions. For example, each GOS supported by the host system 156 may have a corresponding memory portion in the host memory 170. Moreover, the hypervisor 154 may have a corresponding memory portion in the host memory 170. In this regard, the hypervisor 154 may enable data communication between GOSs by controlling the transfer of data from a portion of the memory 170 that corresponds to one GOS to another portion of the memory 170 that corresponds to another GOS.

The CNIC 160 may comprise suitable logic, circuitry, and/or code that may enable communication of data with a network. The CNIC 160 may enable level 2 (L2) switching operations, for example. A stateful network interface, for example, routers may need to maintain per flow state. The TX queue 158a may comprise suitable logic, circuitry, and/or code that may enable posting of data for transmission via the CNIC 160. The RX queue 158b may comprise suitable logic, circuitry, and/or code that may enable posting of data or work requests received via the CNIC 160 for processing by the host system 156. In this regard, the CNIC 160 may post data or work requests received from the network in the RX queue 158b and may retrieve data posted by the host system 156 in the TX queue 158a for transmission to the network. The TX queue 158a and the RX queue 158b may be integrated into the CNIC 160, for example. The CNIC processor 168 may comprise suitable logic, circuitry, and/or code that may enable control and/or management of the data processing and/or networking operations in the CNIC 160. The CNIC memory 166 may comprise suitable logic, circuitry, and/or code that may enable storage of data utilized by the CNIC 160.

The first GOS 152a, the second GOS 152b, and the third GOS 152c may each correspond to an operating system that may enable the running or execution of operations or services such as applications, email server operations, database server operations, and/or exchange server operations, for example. The first GOS 152a may comprise a virtual CNIC 162a, the second GOS 152b may comprise a virtual CNIC 162b, and the third GOS 152c may comprise a virtual CNIC 162c. The virtual CNIC 162a, the virtual CNIC 162b, and the virtual CNIC 162*c* may correspond to software representations of the CNIC 160 resources, for example. In this regard, the CNIC 160 resources may comprise the TX queue 158*a* and the RX queue 158*b*. Virtualization of the CNIC 160 resources via the virtual CNIC 162*a*, the virtual CNIC 162*b*, and the virtual CNIC 162*c* may enable the hypervisor 154 to provide L2 switching support provided by the CNIC 160 to the first GOS 152*a*, the second GOS 152*b*, and the third GOS 152*c*.

In operation, when a GOS in FIG. 1B needs to send a packet to the network, transmission of the packet may be controlled at least in part by the hypervisor 154. The hypervisor 154 may arbitrate access to the CNIC 160 resources when more than one GOS needs to send a packet to the network. In this regard, the hypervisor 154 may utilize the virtual CNIC to indicate to the corresponding GOS the current availability of CNIC 160 transmission resources as a result of the arbitration. The hypervisor 154 may coordinate the transmission of packets from the GOSs by posting the packets in the TX queue 158*a* in accordance with the results of the arbitration operation. The arbitration and/or coordination operations that occur in the transmission of packets may result in added overhead to the hypervisor 154.

When receiving packets from the network via the CNIC 160, the hypervisor 154 may determine the media access control (MAC) address associated with the packet in order to transfer the received packet to the appropriate GOS. In this regard, the hypervisor 154 may receive the packets from the RX queue 158*b* and may demultiplex the packets for transfer to the appropriate GOS. After a determination of the MAC address and appropriate GOS for a received packet, the hypervisor 154 may transfer the received packet from a buffer in the hypervisor controlled portion of the host memory 170 to a buffer in the portion of the host memory 170 that corresponds to each of the appropriate GOSs.

Figure 1C:
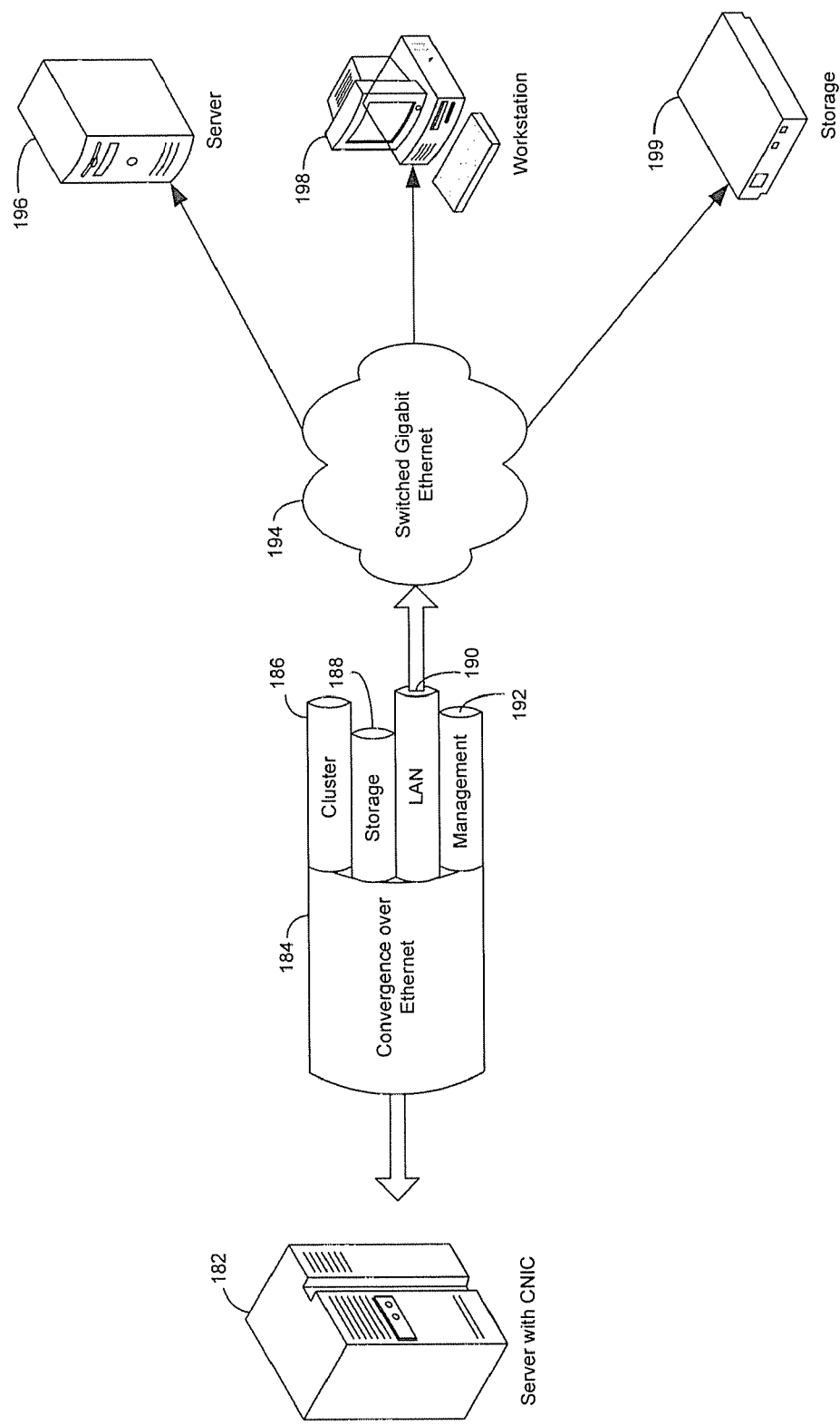
FIG. 1C is a block diagram illustrating an exemplary converged network interface controller architecture that may be utilized in connection with an embodiment of the invention.

FIG. 1C is a block diagram illustrating an exemplary converged network interface controller architecture, in accordance with an embodiment of the invention. Referring to FIG. 1C, there is shown a server with CNIC 182, a convergence over Ethernet cable 184, a switched Gigabit Ethernet (GbE) network 194, a server 196, a workstation 198, and a storage stack 199. The convergence over Ethernet cable 184 may be enabled to carry different types of traffic, for example, cluster traffic 186, storage traffic 188, LAN traffic 190, and/or management traffic 192.

The server with CNIC 182 may comprise suitable logic, circuitry and/or code that may be enabled to perform TCP protocol offload coupled with server operating systems. The server with CNIC 182 may be enabled to support RDMA over TCP offload via RDMA interfaces such as sockets direct protocol (SDP) or WinSock direct (WSD). The server with CNIC 182 may be enabled to support iSCSI offload coupled with server operating system storage stack 199. The server with CNIC 182 may be enabled to provide embedded server management with support for OS present and absent states that may enable remote systems management for rack, blade, and virtualized server systems.

The server with CNIC 182 may allow data center administrators to maximize the value of available server 196 resources by allowing servers to share switched GbE network 196 ports for different types of traffic, for example, cluster traffic 186, storage traffic 188, LAN traffic 190, and/or management traffic 192. The server with CNIC 182 may maximize the value of available server 196 resources by removing network overhead, by simplifying existing cabling and by facilitating infusion of server and network technology upgrades. The aggregation of networking, storage, and clustering I/O offload into the server with CNIC 182 may remove network overhead and may significantly increase effective network I/O.

Figure 2:
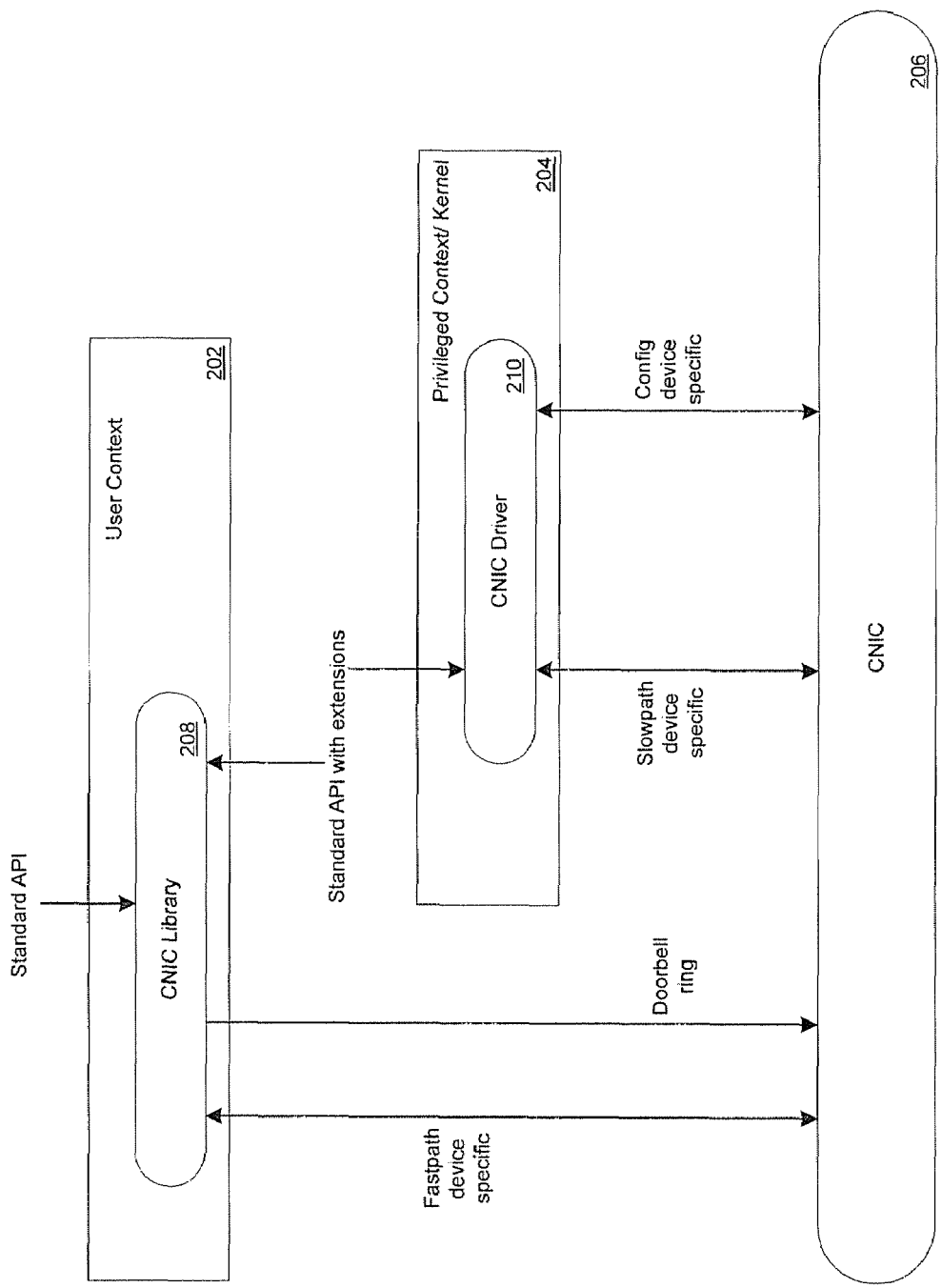
FIG. 2 is a block diagram illustrating a non-virtualized CNIC interface that may be utilized in connection with an embodiment of the invention.

FIG. 2 is a block diagram illustrating a non-virtualized CNIC interface that may be utilized in connection with an embodiment of the invention. Referring to FIG. 2, there is shown a user context block 202, a privileged context/kernel block 204 and a CNIC 206. The user context block 202 may comprise a CNIC library 208. The privileged context/kernel block 204 may comprise a CNIC driver 210.

The CNIC library 208 may be coupled to a standard application programming interface (API). The CNIC library 208 may be coupled to the CNIC 206 via a direct device specific fastpath. The CNIC library 208 may be enabled to notify the CNIC 206 of new data via a doorbell ring. The CNIC 206 may be enabled to coalesce interrupts via an event ring.

The CNIC driver 210 may be coupled to the CNIC 206 via a device specific slowpath. The slowpath may comprise memory-mapped rings of commands, requests, and events, for example. The CNIC driver 210 may be coupled to the CNIC 206 via a device specific configuration path (config path). The config path may be utilized to bootstrap the CNIC 210 and enable the slowpath.

The privileged context/kernel block 204 may be responsible for maintaining the abstractions of the operating system, such as virtual memory and processes. The CNIC library 208 may comprise a set of functions through which applications may interact with the privileged context/kernel block 204. The CNIC library 208 may implement at least a portion of operating system functionality that may not need privileges of kernel code. The system utilities may be enabled to perform individual specialized management tasks. For example, a system utility may be invoked to initialize and configure a certain aspect of the OS. The system utilities may also be enabled to handle a plurality of tasks such as responding to incoming network connections, accepting logon requests from terminals, or updating log files.

The privileged context/kernel block 204 may execute in the processor's privileged mode as kernel mode. A module management mechanism may allow modules to be loaded into memory and to interact with the rest of the privileged context/kernel block 204. A driver registration mechanism may allow modules to inform the rest of the privileged context/kernel block 204 that a new driver is available. A conflict resolution mechanism may allow different device drivers to reserve hardware resources and to protect those resources from accidental use by another device driver.

When a particular module is loaded into privileged context/kernel block 204, the OS may update references the module makes to kernel symbols, or entry points to corresponding locations in the privileged context/kernel block's 204 address space. A module loader utility may request the privileged context/kernel block 204 to reserve a continuous area of virtual kernel memory for the module. The privileged context/kernel block 204 may return the address of the memory allocated, and the module loader utility may use this address to relocate the module's machine code to the corresponding loading address. Another system call may pass the module and a corresponding symbol table that the new module wants to export, to the privileged context/kernel block 204. The module may be copied into the previously allocated space, and the privileged context/kernel block's 204 symbol table may be updated with the new symbols.

The privileged context/kernel block 204 may maintain dynamic tables of known drivers, and may provide a set of routines to allow drivers to be added or removed from these tables. The privileged context/kernel block 204 may call a module's startup routine when that module is loaded. The privileged context/kernel block 204 may call a module's cleanup routine before that module is unloaded. The device drivers may include character devices such as printers, block devices and network interface devices.

Figure 3:
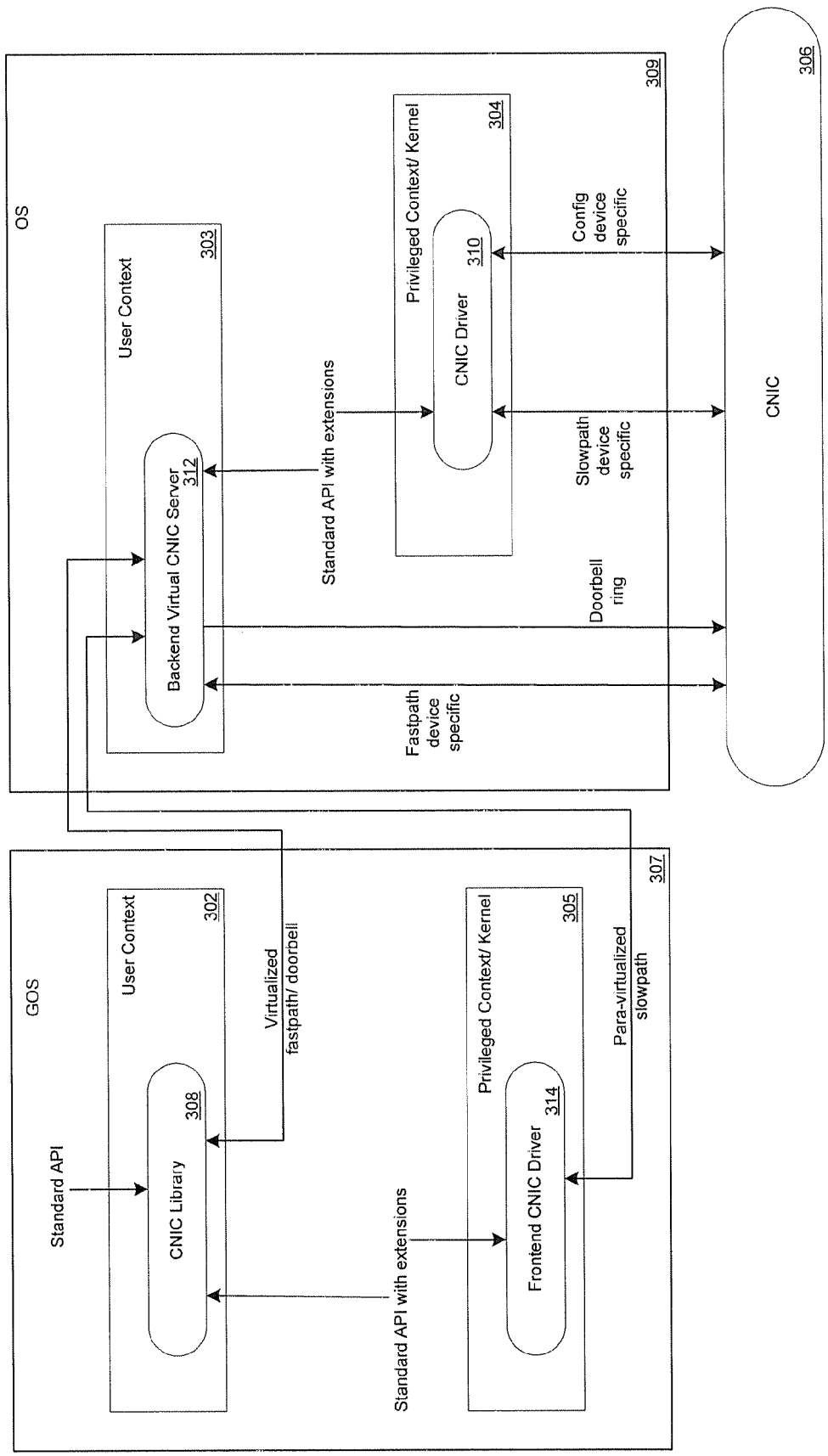
FIG. 3 is a block diagram illustrating a para-virtualized CNIC interface, in accordance with an embodiment of the invention.

FIG. 3 is a block diagram illustrating a para-virtualized CNIC interface, in accordance with an embodiment of the invention. Referring to FIG. 3, there is shown a GOS 307, an operating system (OS) 309, and a CNIC 306. The GOS 307 may comprise a user context block 302, and a privileged context/kernel block 305. The OS 309 may comprise a user context block 303, and a privileged context/kernel block 304. The user context block 302 may comprise a CNIC library 308. The privileged context/kernel block 305 may comprise a front-end CNIC driver 314. The user context block 303 may comprise a backend virtual CNIC server 312. The privileged context/kernel block 304 may comprise a CNIC driver 310.

The CNIC library 308 may be coupled to a standard application programming interface (API). The backend virtual CNIC server 312 may be coupled to the CNIC 306 via a direct device specific fastpath. The backend virtual CNIC server 312 may be enabled to notify the CNIC 306 of new data via a doorbell ring. The CNIC 306 may be enabled to coalesce interrupts via an event ring.

The CNIC driver 310 may be coupled to the CNIC 306 via a device specific slowpath. The slowpath may comprise memory-mapped rings of commands, requests, and events, for example. The CNIC driver 310 may be coupled to the CNIC 306 via a device specific configuration path (config path). The config path may be utilized to bootstrap the CNIC 306 and enable the slowpath.

The frontend CNIC driver 314 may be para-virtualized to relay config/slowpath information to the backend virtual CNIC server 312. The frontend CNIC driver 314 may be placed on a network's frontend or the network traffic may pass through the frontend CNIC driver 314. The backend virtual CNIC server 312 may located in the network's backend. The backend virtual CNIC server 312 may function in a plurality of environments, for example, virtual machine (VM) 0, or driver VM, for example. The backend virtual CNIC server 312 may be enabled to invoke the CNIC driver 310. The CNIC library 308 may be coupled to the backend virtual CNIC server 312 via a virtualized fastpath/doorbell. The CNIC library 308 may be device independent.

In a para-virtualized system, the guest operating systems may run in a higher or less privileged ring compared to ring 0. Ring depriviledging includes running guest operating systems in a ring higher than 0. An OS may be enabled to run guest operating systems in ring 1, which may be referred to as current privilege level 1 (CPL 1) of the processor. The OS may run a virtual machine monitor (VMM), or the hypervisor 154, in CPL 0. A hypercall may be similar to a system call. A system call is an interrupt that may be invoked in order to move from user space (CPL 3) or user context block 302 to kernel space (CPL 0) or privileged context/kernel block 304. A hypercall may be enabled to pass control from ring 1, where the guest domains run, to ring 0, where the OS runs.

Domain 0 may have direct access to the hardware devices, and it may utilize the device drivers. Domain 0 may have another backend layer that may comprise the backend virtual CNIC server 312. The unprivileged domains may have access to a frontend layer, which comprises the frontend CNIC driver 314. The unprivileged domains may issue I/O requests to the frontend similar to the I/O requests that are transmitted to a kernel. However, because the frontend is a virtual interface with no access to real hardware, these requests may be delegated to the backend. The requests may then be sent to the physical devices. When an unprivileged domain is created, it may create an interdomain event channel between itself and domain 0. The event channel may be a lightweight channel for passing notifications, such as indicating when an I/O operation has completed. A shared memory area may exist between each guest domain and domain 0. This shared memory may be utilized to pass requests and data. The shared memory may be created and handled using the API.

Figure 4:
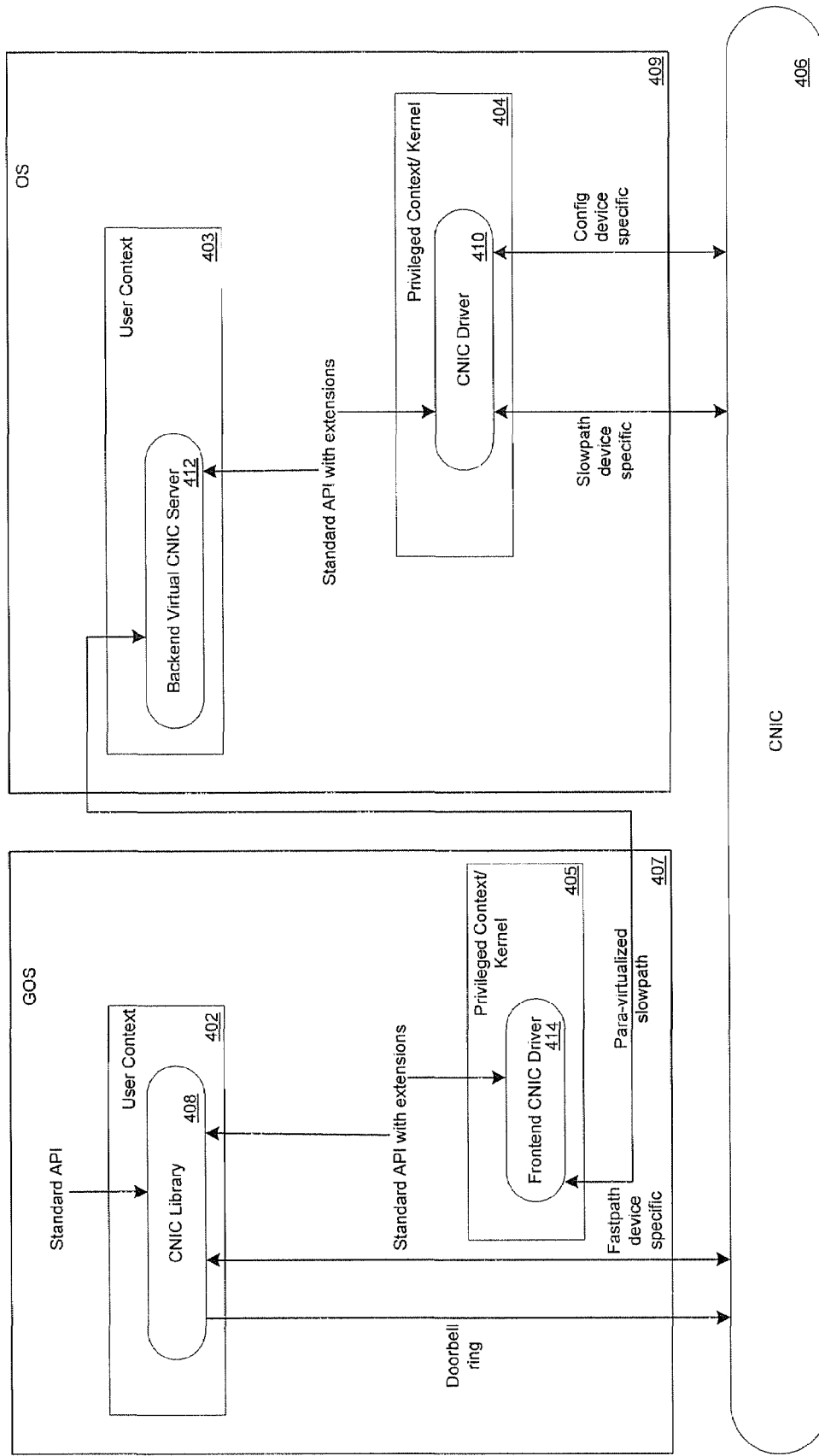
FIG. 4 is a block diagram illustrating a para-virtualized CNIC interface with a restored fastpath, in accordance with an embodiment of the invention.

FIG. 4 is a block diagram illustrating a para-virtualized CNIC interface with a restored fastpath, in accordance with an embodiment of the invention. Referring to FIG. 4, there is shown a GOS 407, an operating system (OS) 409, and a CNIC 406. The GOS 407 may comprise a user context block 402, and a privileged context/kernel block 405. The OS 409 may comprise a user context block 403, and a privileged context/kernel block 404. The user context block 402 may comprise a CNIC library 408. The privileged context/kernel block 405 may comprise a front-end CNIC driver 414. The user context block 403 may comprise a backend virtual CNIC server 412. The privileged context/kernel block 404 may comprise a CNIC driver 410.

The CNIC library 408 may be coupled to a standard application programming interface (API). The CNIC library 408 may be coupled to the CNIC 406 via a direct device specific fastpath. The CNIC library 408 may be enabled to notify the CNIC 406 of new data via a doorbell ring. The CNIC 406 may be enabled to coalesce interrupts via an event ring.

The CNIC driver 410 may be coupled to the CNIC 406 via a device specific slowpath. The slowpath may comprise memory-mapped rings of commands, requests, and events, for example. The CNIC driver 410 may be coupled to the CNIC 406 via a device specific configuration path (config path). The config path may be utilized to bootstrap the CNIC 406 and enable the slowpath.

The frontend CNIC driver 414 may be para-virtualized to relay config/slowpath information to the backend virtual CNIC server 412. The backend virtual CNIC server 412 may enable fastpath directly from the CNIC library 408 to the CNIC 406 by mapping user virtual memory to true bus addresses. The backend virtual CNIC server 412 may be enabled to map the CNIC doorbell space to the GOS 407 and add it to the user map.

Figure 5:
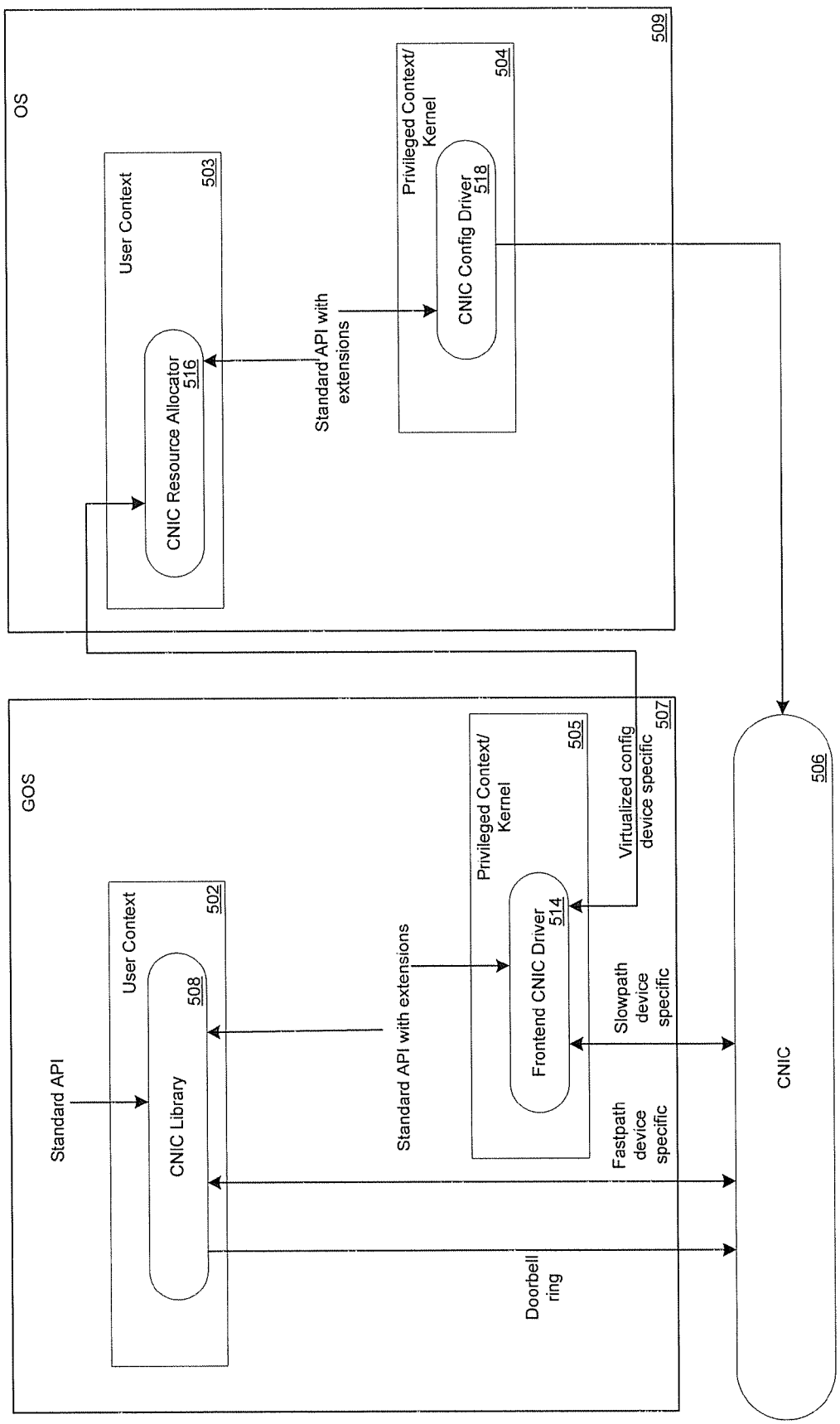
FIG. 5 is a block diagram illustrating a virtualized CNIC interface, in accordance with an embodiment of the invention.

FIG. 5 is a block diagram illustrating a virtualized CNIC interface, in accordance with an embodiment of the invention. Referring to FIG. 5, there is shown a GOS 507, an operating system (OS) 509, and a CNIC 506. The GOS 507 may comprise a user context block 502, and a privileged context/kernel block 505. The OS 509 may comprise a user context block 503, and a privileged context/kernel block 504. The user context block 502 may comprise a CNIC library 508. The privileged context/kernel block 505 may comprise a front-end CNIC driver 514. The user context block 503 may comprise a CNIC resource allocator 516. The privileged context/kernel block 504 may comprise a CNIC configuration driver 518.

The CNIC library 508 may be interfaced with a standard application programming interface (API). The CNIC library 508 may be coupled to the CNIC 506 via a direct device specific fastpath. The CNIC library 508 may be enabled to notify the CNIC 506 of new data via a doorbell ring. The CNIC 506 may be enabled to coalesce interrupts via an event ring.

The frontend CNIC driver 514 may be coupled to the CNIC 506 via a device specific slowpath. The slowpath may comprise memory-mapped rings of commands, requests, and events, for example. The frontend CNIC driver 514 may be coupled to the CNIC 506 via a device specific configuration path (config path). The config path may be utilized to bootstrap the CNIC 506 and enable the slowpath.

The frontend CNIC driver 514 may be virtualized to relay config path/slowpath information to the CNIC resource allocator 516. The CNIC configuration driver 518 may be enabled to partition resources between the GOS 507 and the OS 509. The CNIC configuration driver 518 may report allocated resources to each OS to the CNIC 506. In accordance with an embodiment of the invention, an interface may be added to request and/or release blocks of resources dynamically.

Figure 6:
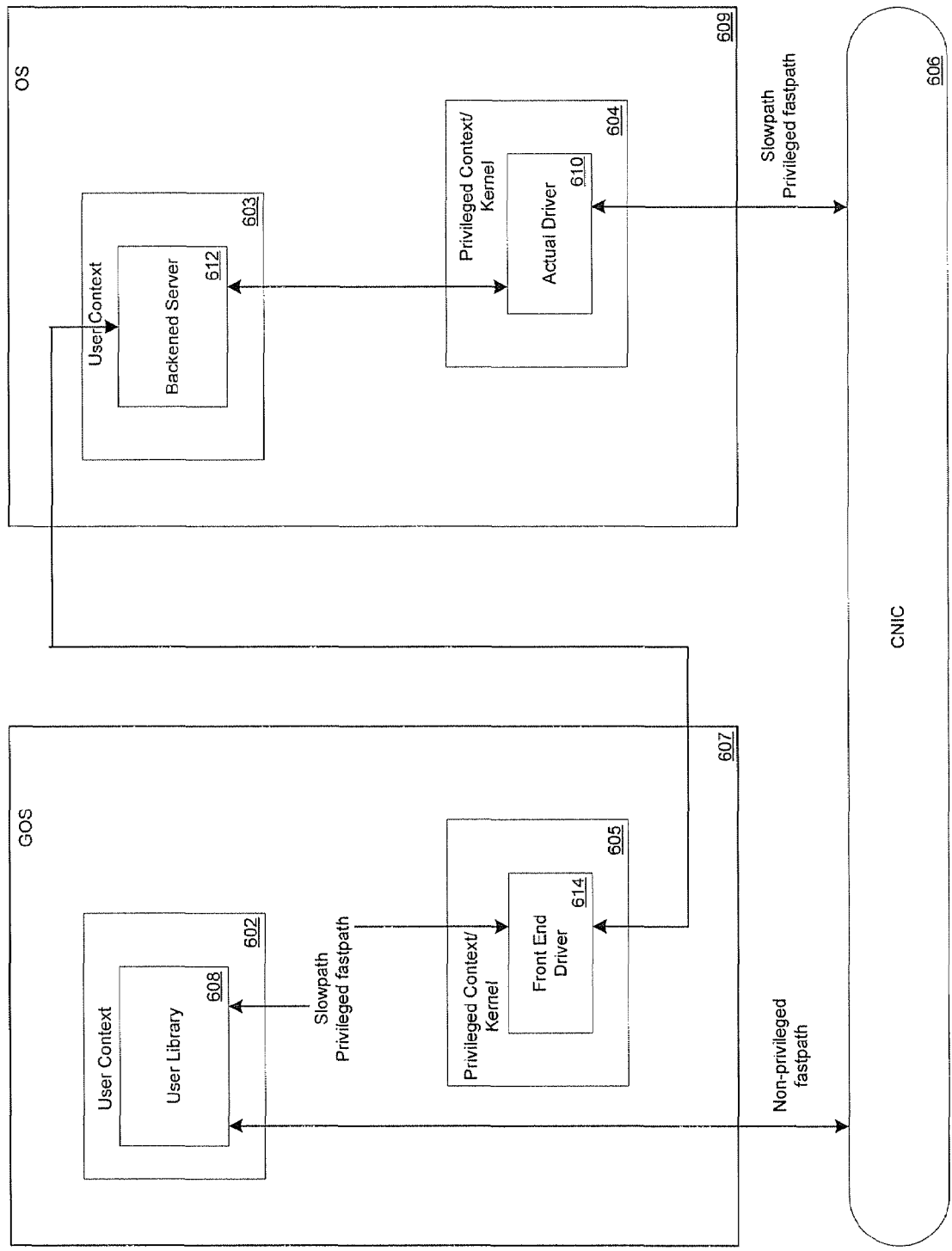
FIG. 6 is a block diagram illustrating backend translation of imbedded addresses in a virtualized CNIC interface, in accordance with an embodiment of the invention.

FIG. 6 is a block diagram illustrating backend translation of imbedded addresses in a virtualized CNIC interface, in accordance with an embodiment of the invention. Referring to FIG. 6, there is shown a GOS 607, an operating system (OS) 609, and a CNIC 606. The GOS 607 may comprise a user context block 602, and a privileged context/kernel block 605. The OS 609 may comprise a user context block 603, and a privileged context/kernel block 604. The user context block 602 may comprise a user library 608 and the privileged context/kernel block 605 may comprise a front-end driver 614. The user context block 602 may comprise a backend server 612 and the privileged context/kernel block 604 may comprise a driver 610.

The user library 608 may be coupled to the CNIC 606 via a direct non-privileged fastpath. The GOS 607 may be enabled to pin and DMA map the memory pages. The existing fastpath/slowpath interface may include embedded DMA addresses within work requests and objects. The backend server 612 may be enabled to translate the embedded addresses. The privileged fastpath and slowpath may be routed to the CNIC 606 via the front-end driver 614, the backend server 612, and the driver 610. As a result, the privileged fastpath may not be fast. The iSCSI and NFS client daemons may want to utilize fast memory registers (FMRs) on the fastpath.

Figure 7:
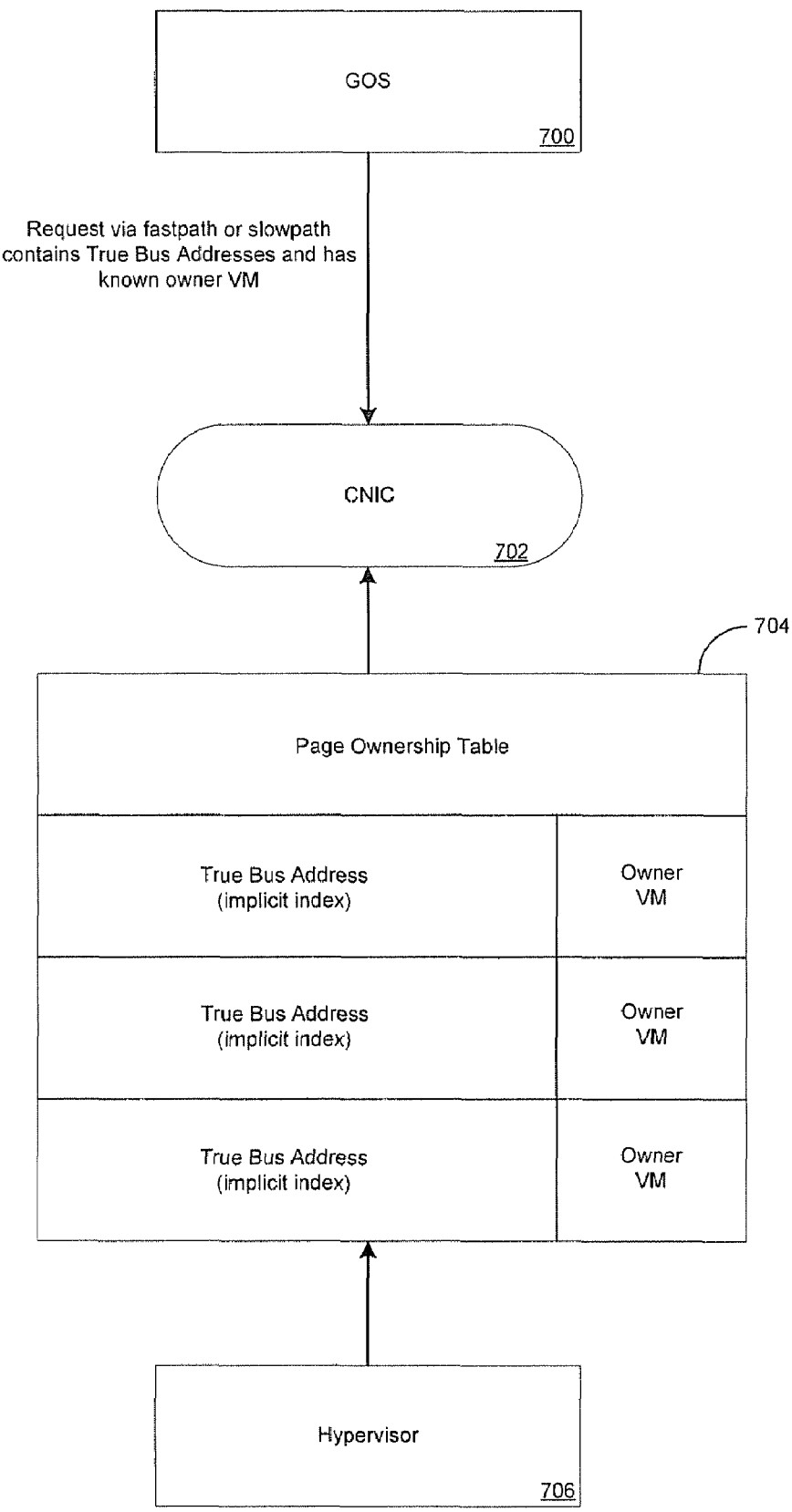
FIG. 7 is a block diagram illustrating para-virtualized memory maps, in accordance with an embodiment of the invention.

FIG. 7 is a block diagram illustrating para-virtualized memory maps, in accordance with an embodiment of the invention. Referring to FIG. 7, there is shown a GOS 700, a CNIC 702, a page ownership table 704 and a hypervisor 706.

The GOS 700 may have read-access to true memory maps of the operating system. The page ownership table 704 may comprise a list of a plurality of true bus addresses and their corresponding addresses in a virtual memory. The hypervisor 706 may be enabled to update and manage the page ownership table 704. The GOS 700 may be enabled to provide true system bus addresses to CNIC 702 directly. The CNIC 702 may validate that the page belongs to a particular virtual machine (VM). The CNIC 702 may receive information regarding ownership of each fastpath and slowpath interface. The CNIC 702 may be enabled to reject attempts by a VM to reference a page that the CNIC 702 may not own. The page ownership table 704 may allow a virtualization aware GOS 700 to provide system physical addresses directly to CNIC 702. The CNIC 702 may be enabled to verify the ownership of the resource.

The kernel may also be enabled to maintain a physical view of each address space. The page ownership table 704 entries may determine whether a current location of each page of virtual memory is on disk or in physical memory. The CPU memory maps may be managed by background code and interrupts that may be triggered by the CPU to access unmapped pages. In accordance with an embodiment of the invention, deferred pinning of the memory pages may allow I/O mapping of memory pages even if there are absent memory pages.

When a process attempts to access a page within a region, the page ownership table 704 may be updated with the address of a page within the kernel's page cache corresponding to the appropriate offset in the file. This page of physical memory may be utilized by the page cache and by the process' page tables so that changes made to the file by the file system may be visible to other processes that have mapped that file into their address space. The mapping of a region into the process' address space may be either private or shared. If a process writes to a privately mapped region, then a pager may detect that a copy on write may be necessary to keep the changes local to the process. If a process writes to a shared mapped region, the object mapped into that region may be updated, so that the change may be visible to other processes that are mapping that object.

Figure 8:
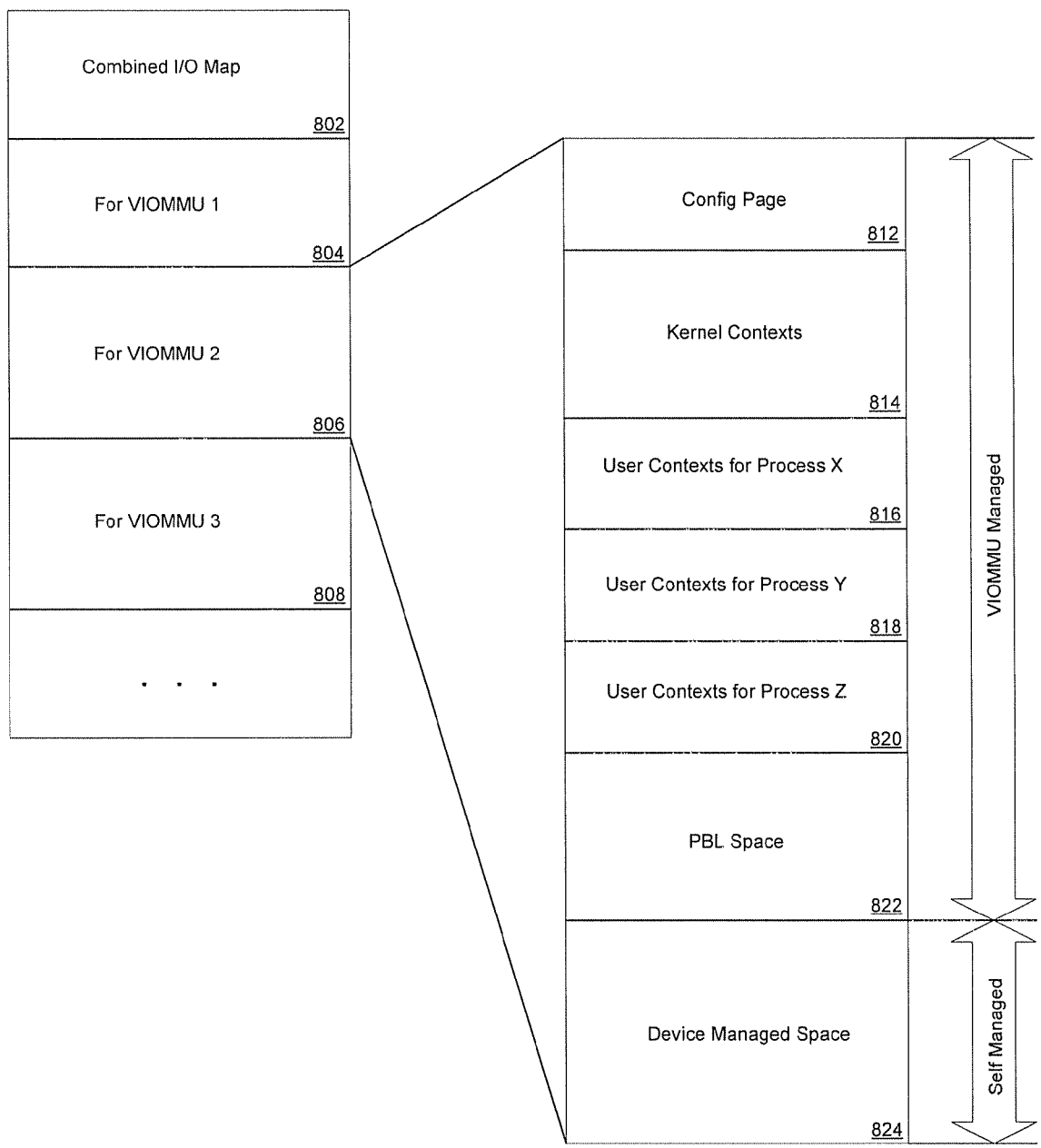
FIG. 8 is a block diagram illustrating a single virtual input/output memory map that may be logically sub-allocated to different virtual machines, in accordance with an embodiment of the invention.

FIG. 8 is a block diagram illustrating a single virtual input/output memory map that may be logically sub-allocated to different virtual machines, in accordance with an embodiment of the invention. Referring to FIG. 8, there is shown a combined I/O map 802. The combined 10 map 802 may comprise logical maps of a plurality of virtual input/output (I/O) memory management units (VIOMMUs), VIOMMU 1 804, VIOMMU 2 806, and VIOMMU 3 808. The VIOMMU 1 804 may comprise a configuration page 812, a kernel context block 814, a user context block for process X 816, a user context block for process Y 818, a user context block for process Z 820, a physical buffer list (PBL) space block 822, and a device managed space block 824.

An IOMMU may present a distinct I/O memory map for each I/O domain, and may map each combination of bus, device and function (BDF) to a distinct domain. There may be disadvantages to allocating a distinct BDF identifier for each virtual machine. Each BDF may have associated resources that may be related to device discovery and configuration that may be a part of the bus discovery process. It may not be desirable to allocate these resources redundantly, and to repeat the discovery process redundantly. In accordance with an embodiment of the invention, the CNIC 702 may be enabled to logically sub-divide a single I/O memory map for a single BDF into multiple I/O memory maps.

The GOS 700 may be enabled to create linear DMA address space through virtual IOMMUs. The CNIC 606 may be enabled to translate and/or check virtual IOMMU address to actual combined DMA address space, which may or may not be maintained in collaboration with an IOMMU. The CNIC 702 may be enabled to prevent swapping of the portion of the memory pages by the hypervisor 706 based on validating mapping of the dynamically pinned portion of the memory pages.

In one exemplary embodiment of the invention, a user process write to a page may be write protected. The hypervisor 706 may be enabled to ring a doorbell for the user. In another exemplary embodiment of the invention, the doorbell pages may be directly assigned to the GOS 700 instead of assigning the doorbell pages to a CNIC 702. The GOS 700 may be enabled to assign pages to a user process, for example, the user context block for process X 816, the user context block for process Y 818, or the user context block for process Z 820.

In a non-virtualized environment, the pages accessible by the CNIC 606 may be pinned and memory mapped. The kernel context block 814 may act as a privileged resource manager to determine the amount of memory a particular processes may pin. In one exemplary embodiment of the invention, the pin requests may be translated to hypervisor 706 calls. In another exemplary embodiment of the invention, the CNIC 606 may apply a deferred pinning mechanism. The hypervisor 702 may give preference to mapped pages compared to unmapped pages for the same VM. The mapping of pages may not provide any preference compared to other VMs. The CNIC 606 may be enabled to pin a limited number of pages just in time. The doorbell pages may belong to the CNIC 702, while the context pages may belong to domain 0, for example. Each GOS 700 may comprise a set of matching pages. Each connection context may have a matched doorbell. The doorbell pages and the context pages may form a linear address space for the CNIC 606. The CNIC 606 may be aware of the ownership of each page.

At least a portion of a plurality of addresses within the virtual input/output memory map, for example, VIOMMU 1 804 may be offset from at least a portion of a plurality of addresses within a physical input/output memory map in the page ownership table 704. The VIOMMU 1 804 may be enabled to manage the contents of each process' virtual address space. The pages in a page cache may be mapped into VIOMMU 1 804 if a process maps a file into its address space.

The VIOMMU 1 804 may be enabled to create pages of virtual memory on demand, and manage the loading of those pages from a disk or swapping those pages back to a disk as required. The address space may comprise a set of non-overlapping regions. Each region may represent a continuous, page-aligned subset of the address space. Each region may be described internally by a structure that may define the properties of the region, such as the processor's read, write, and execute permissions in the region, and information about any files associated with the region. The regions for each address space may be linked into a balanced binary tree to allow fast lookup of the region corresponding to any virtual address.

Figure 9:
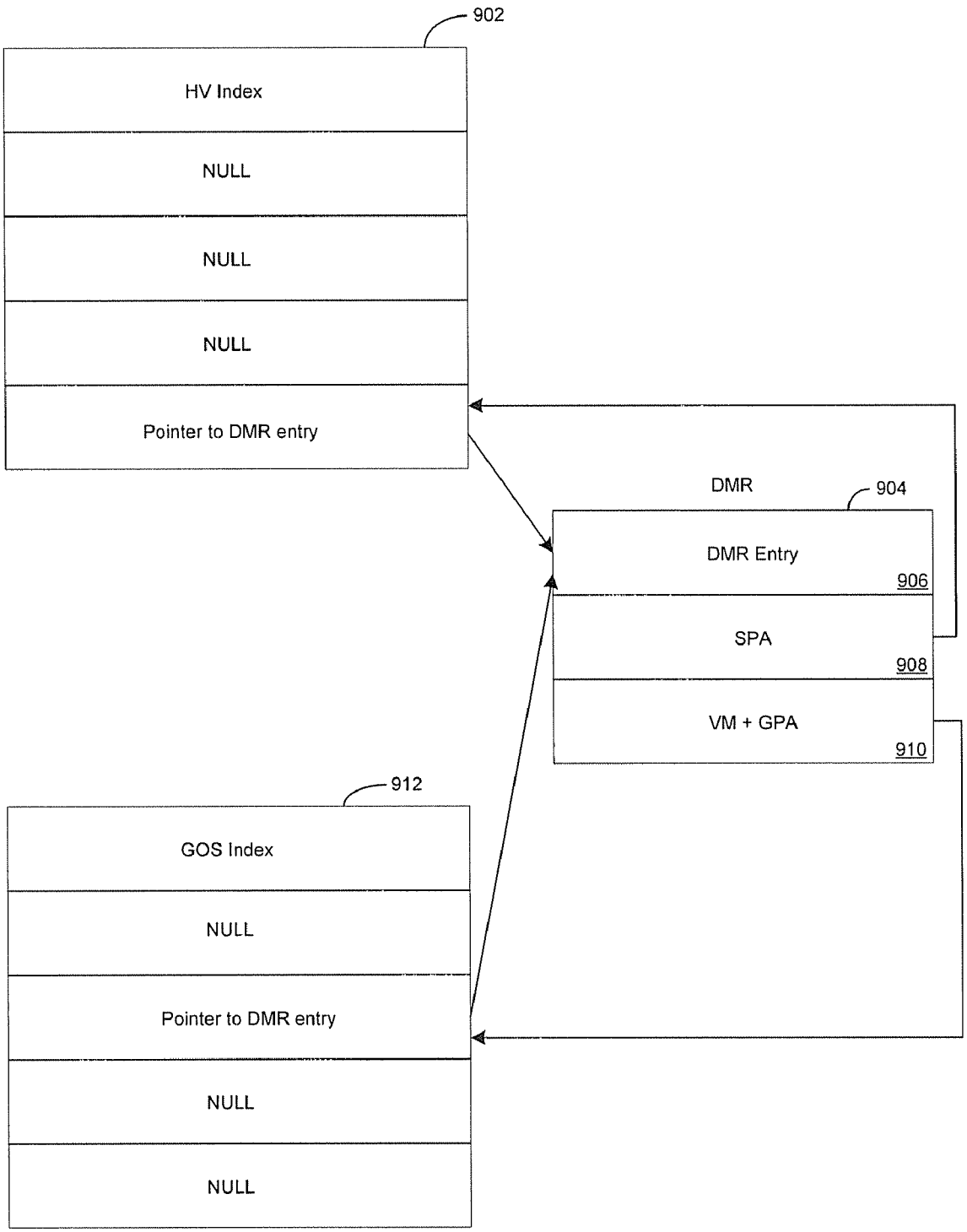
FIG. 9 is a block diagram illustrating just in time pinning, in accordance with an embodiment of the invention.

FIG. 9 is a block diagram illustrating just in time pinning, in accordance with an embodiment of the invention. Referring to FIG. 9, there is shown a hypervisor (HV) index 902, a GOS index 912, and a dynamic memory region (DMR) 904. The DMR 904 may comprise a DMR entry 906, a system physical address (SPA) 908, and a guest physical address (GPA) 910.

The DMR 904 may allocate page table entries (PTEs) for each VM to map memory pages, and invoke just-in-time pinning. Each VM may have a limit on the number of memory pages referenced in DMR 904, and accordingly a limit on the number of memory pages it may pin. The deferred pinning may be performed by the CNIC 606. While a memory page is in the DMR 904, the CNIC 702 may prevent the hypervisor 706 from swapping the memory page out. The memory page may be indexed by the true bus address so that the hypervisor 706 may be enabled to quickly determine whether a specific system physical address has been pinned. If the CNIC 606 trusts the origin of the memory page, one bit may be utilized per memory page. Else, if the CNIC 606 does not trust the origin of the memory page, the index of DMR entry 904 may be utilized per memory page.

The DMR entry 906 may add SPA 908 and GPA 910 for cross checking and verification. The hypervisor 706 may not swap out a memory page while the memory page is in the DMR 904. An advisory index, VM+GPA 910 may be enabled to quickly determine whether a specific guest physical address has been pinned. The HV index 902 may be preallocated by the hypervisor 706 at startup time. The GOS index 912 may be allocated and then assigned, or may be allocated as part of the hypervisor's GOS context. The CNIC 606 may be write-enabled for the HV index 902 and the GOS index 912. The GOS index 912 may be readable by GOS 700. The CNIC 702 may be enabled to check a guest operating system (GOS) index 912 to validate the mapping of the dynamically pinned portion of the plurality of memory pages. The CNIC 702 may be enabled to prevent swapping of the portion of the plurality of memory pages by the guest operating system (GOS) 700 based on validating mapping of the dynamically pinned portion of the plurality of memory pages.

The direct memory register (DMR) 904 slot may be released when the steering tag (STag) is invalidated to process fast memory register (FMR) work requests. The mapping of the CNIC 702 may be cached in the QP contexts block 804. For example, the mapping of the CNIC 702 may be cached on a first reference to a STag for an incoming work request, or on a first access to a data source STag when processing a work request.

Figure 10:
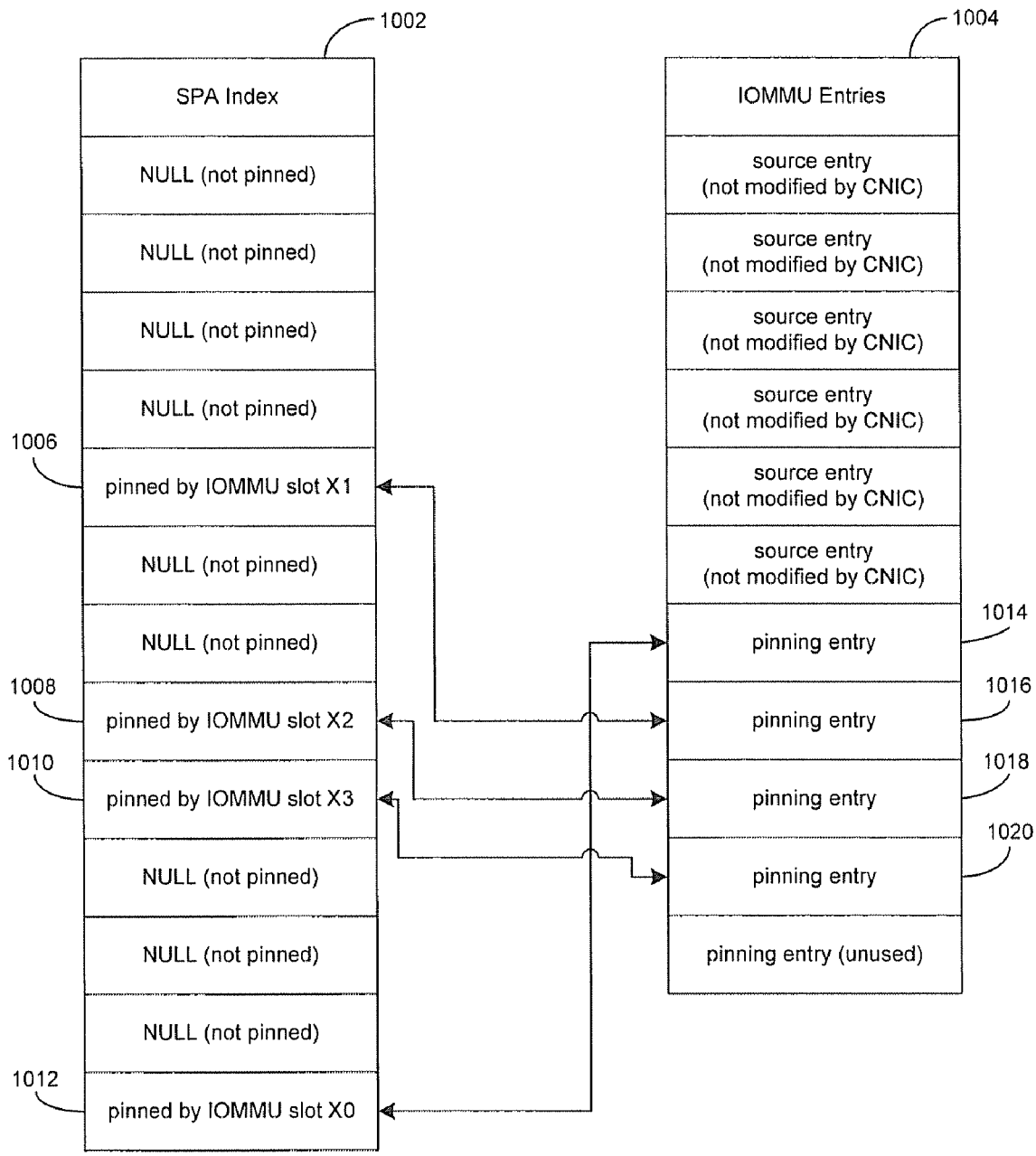
FIG. 10 is a block diagram illustrating mapping of pinned memory pages in accordance with an embodiment of the invention.

FIG. 10 is a block diagram illustrating mapping of pinned memory pages in accordance with an embodiment of the invention. Referring to FIG. 10, there is shown a system physical address (SPA) index 1002, and an IOMMU map 1004.

The offset in the SPA index 1002 may be obtained by dividing a SPA by a SPA index size, which may be a multiple of the page/block size. A NULL entry may indicate that the CNIC 702 has not placed a hold on the matching SPA address range. The hypervisor 706 and/or GOS 700 may be enabled to assign these memory pages to other applications. A non-NULL entry may indicate that the CNIC 702 intends to place a hold on the matching SPA address range. If the non-NULL entry is validated, this hold may prevent the hypervisor 706 and GOS 700 from assigning pages in this SPA range to other applications. For example, pinning entry 1014 may be pinned by IOMMU slot X0 1012. The pinning entry 1016 may be pinned by IOMMU slot X1 1006. The pinning entry 1018 may be pinned by IOMMU slot X2 1008. The pinning entry 1020 may be pinned by IOMMU slot X3 1010.

Figure 11:
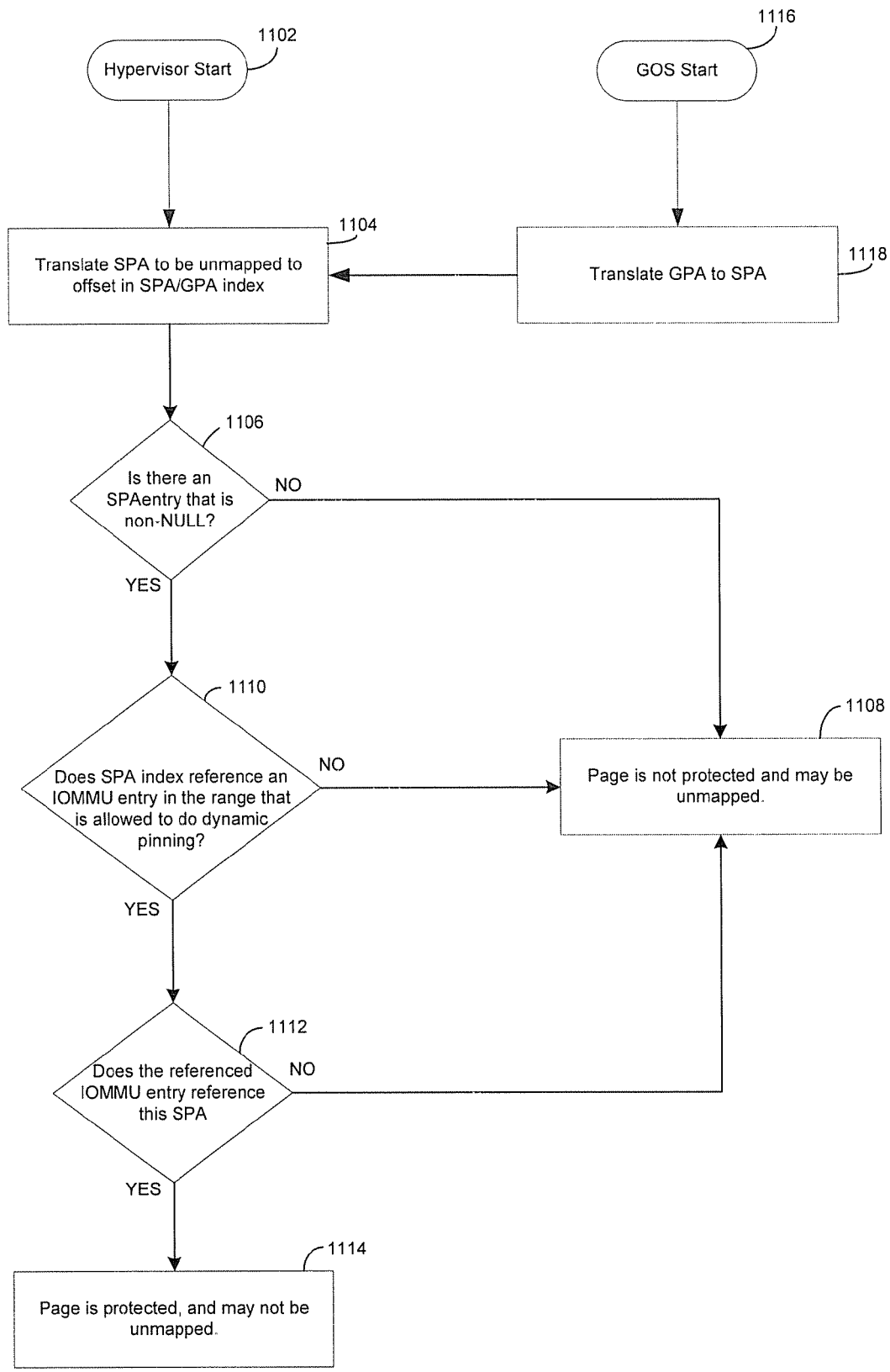
FIG. 11 is a flowchart illustrating exemplary steps for deferred pinning of host memory for stateful network interfaces, in accordance with an embodiment of the invention.

FIG. 11 is a flowchart illustrating exemplary steps for deferred pinning of host memory for stateful network interfaces, in accordance with an embodiment of the invention. Referring to FIG. 11, exemplary steps may begin at step 1102. In step 1104, a particular system physical address (SPA) or guest physical address (GPA) to be unmapped and translated may be offset in the SPA index 1002. In step 1106, it may be determined whether the SPA index 1002 comprises at least one non-NULL SPA index entry. If the SPA index 1002 does not comprise at least one non-NULL SPA index entry, control passes to step 1108. In step 1108, the requested memory page may not be protected and may be unmapped.

If the SPA index 1002 comprises at least one non-NULL SPA index entry, control passes to step 1110. In step 1110, it may be determined whether the SPA index 1002 references an IOMMU entry in the allowable range for dynamic pinning by the CNIC 702. If the SPA index 1002 does not reference an IOMMU entry in the allowable range for dynamic pinning by the CNIC 702, control passes to step 1108. If the SPA index 1002 references an IOMMU entry in the allowable range for dynamic pinning by the CNIC 702, control passes to step 1112. In step 1112, it may be determined whether the referenced IOMMU entry references a particular SPA 908. If the referenced IOMMU entry references a particular SPA 908, control passes to step 1114. In step 1114, the requested memory page may be protected and may not be unmapped. If the referenced IOMMU entry does not reference a particular SPA 908, control passes to step 1108.

In step 1116, exemplary steps to validate a guest physical address (GPA) may begin. In step 1118, the GOS 700 may translate the GPA to a SPA. Control then passes to step 1104. The GOS 700 may be unaware that it is being virtualized if it is unable to obtain a GPA to SPA translation. The hypervisor 706 may be enabled to either accept a requested update of the GPA 700 and release the SPA for re-use later, or it may present the GOS 700 with a virtualized shadow of the IOMMU map 1004.

In accordance with an embodiment of the invention, the CNIC 702 may be enabled to place a finite number of holds on at least a portion of a plurality of memory pages. The CNIC 702 may be enabled to instruct the hypervisor 706 and the GOS 700 to refrain from swapping out the portion of the plurality of memory pages. The CNIC 702 may be enabled to place the hold without invoking the hypervisor 706. The CNIC 702 may be enabled to update a hypervisor 706 hold slot or hypervisor index 902 based on the SPA 908 so that the hypervisor 706 may be able to check if a given SPA 908 is valid. The CNIC 702 may be enabled to update a GOS index 912 based on the virtual machine (VM) and GPA 910 so that each GOS 700 may be able to check if a given GPA is valid. The hypervisor 706 may be enabled to validate an index entry in the HV index 902 by checking that a hold slot has the same SPA 908. The hypervisor 706 may be enabled to control a number of memory pages that may be pinned by the CNIC 702.

In accordance with an exemplary embodiment of the invention, the CNIC 702 may be enabled to translate the pages after dynamically pinning the pages. The CNIC 702 may be enabled to recognize a plurality of special absent values. For example, the CNIC 702 may be enabled to recognize a fault unrecoverable value, where the operation attempting this access in error may be aborted. The CNIC 702 may detect an absent value when a required page is momentarily absent, and a notification to the hypervisor 706 may be deferred, or the operation may be deferred. The hypervisor 706 may be notified by specifying the particular doorbell to ring when an error is fixed. The notification to the GOS 700 may be deferred accordingly, but the GOS 700 may be notified to fix the problem. In another embodiment of the invention, the operation may be deferred but the hypervisor 706 and the GOS 700 may not be notified when the pages are being moved. The mapping of the pages may be restored to a valid value without a need for device notification.

In accordance with an exemplary embodiment of the invention, the CNIC 702 or any other network interface device that may maintain connection context data or are stateful may be allowed to pin host memory just in time while maintaining direct access to application buffers to enable zero-copy transmit and placement. The CNIC 702 may be enabled to manage a portion of the DMA address space. The contents of the page ownership table 704 supporting this address space may be copied from the host processor 124 maintained DMA address page ownership table such that a particular process may access the pages, if the process has been granted access by the host processor 124.

The memory pages may be registered to enable CNIC 702 access without requiring that the memory pages to be hard-pinned. The privileged context/kernel block 604 and/or hypervisor 706 may be enabled to migrate or swap out memory pages until the CNIC 702 places the memory pages in the CNIC 702 or device managed space 824. The CNIC 702 may be enabled to maintain indexes, for example, the hypervisor index 902 and/or the GOS index 912, which may allow the virtual memory managers to determine whether a page has been dynamically pinned by the CNIC 702. The deferred pinning mechanism may provide deterministic bounding of the time required to check if a page was in use, and may be enabled to limit a number of pages from being swapped by the CNIC 702.

An RDMA device driver may be enabled to register memory pages by pinning caching the mapping from a virtual address to a device accessible DMA address. In accordance with an exemplary embodiment of the invention, the CNIC 702 may be enabled to pin at least a portion of a plurality of pages by updating the memory shared with the hypervisor 706 and/or the OS. The CNIC 702 may not have to wait for a response from the host processor 124.

For each virtual memory map, for example, VIOMMU 1 804, the hypervisor 706 may maintain a page ownership table 704 that may translate a virtual address (VA) to a system physical address (SPA). The page ownership table 704 may be based upon the GOS 700 maintained mapping from a VA to a guest physical address (GPA) and the hypervisor 706 maintained mapping from a GPA to a SPA. A plurality of memory interfaces may allow the GOS 700 to modify a particular VA to GPA mapping. The hypervisor 706 may be enabled to translate the VA to SPA mapping. A plurality of memory interfaces may allow the GOS 700 to be aware of the VA to SPA mapping directly, but they may request the hypervisor 706 to allocate new pages and modify the memory pages.

An I/O memory map may enable translation of an IOMMU address to a SPA, for a specific IOMMU map. The IOMMU map may be a subset of a VA to SPA mapping. Each GOS 700 may be aware of the GPA to SPA mapping and may be enabled to supply the address information for an IOMMU map directly to the CNIC 702 or IOMMU, for example, VIOMMU 1 804. The page ownership table 704 may enable the CNIC 702 to trust the GOS 700 because any misconfiguration of a portion of an IOMMU map may corrupt the GOS 700 itself. The entries in the IOMMU map may not be pinned beforehand but may be pinned dynamically or "just in time".

The CNIC 702 may be enabled to copy a plurality of IOMMU map entries from the same VIOMMU map, for example, VIOMMU 1 804. The CNIC 702 may be enabled to access a particular memory page that may be accessed by a VM. A portion of each VIOMMU map, for example, VIOMMU 1 804 may represent a plurality of memory pages that have been pinned dynamically or "just in time" by the CNIC 702. The hypervisor 704 and GOS 700 may be prevented from accessing the portion of the plurality of memory pages dynamically pinned by the CNIC 702. The hypervisor 704 may limit the number of memory pages that may be dynamically pinned by the CNIC 702 by the number of slots available for allocation. The HV index 902 may allow the hypervisor 706 to determine whether a specific SPA is pinned. The HV index 902 may enable validation of a DMR slot that has been allocated to pin a specific SPA. The GOS index 912 may allow each GOS 700 to determine whether a specific GPA in their VM has been pinned. The GOS index 912 may enable validation of a DMR slot that has been allocated.

In accordance with an exemplary embodiment of the invention, a method and system for deferred pinning of host memory for stateful network interfaces may comprise a CNIC 702 that enables pinning of at least one of a plurality of memory pages. At least one of: a hypervisor 706 and a guest operating system (GOS) 702 may be prevented from swapping the pinned at least one of the plurality of memory pages. The CNIC 702 may be enabled to dynamically pin at least one of the plurality of memory pages. The CNIC 702 may be enabled to allocate at least one of the plurality of memory pages to at least one virtual machine. The CNIC 702 may be enabled to determine whether at least one virtual machine has access to reference the allocated plurality of memory pages. At least a portion of a plurality of addresses of the plurality of memory pages within a VIOMMU, for example, VIOMMU 1 804 may be offset from at least a portion of a plurality of addresses within a physical input/output memory map. The CNIC 702 may be enabled to check an index of the hypervisor 706, for example, the hypervisor index 902 to validate mapping of the pinned plurality of memory pages. The CNIC 702 may be enabled to prevent swapping of the plurality of memory pages by the hypervisor 706 based on the validation. The CNIC 702 may be enabled to update the index of the hypervisor 706 after the mapping of the pinned plurality of memory pages.

The CNIC 702 may be enabled to generate a page fault, if at least one of: the hypervisor 706 and the GOS 700 swaps out at least one of the plurality of memory pages after pinning. The CNIC 702 may be enabled to check an index of the GOS 700, for example, the GOS index 912 to validate the mapping of the pinned plurality of memory pages. The CNIC 702 may be enabled to prevent the swapping of at least one of the plurality of memory pages by the GOS 700 based on the validation.

Another embodiment of the invention may provide a machine-readable storage, having stored thereon, a computer program having at least one code section executable by a machine, thereby causing the machine to perform the steps as described above for deferred pinning of host memory for stateful network interfaces.

Accordingly, the present invention may be realized in hardware, software, or a combination of hardware and software. The present invention may be realized in a centralized fashion in at least one computer system, or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A method for handling processing of network information, the method comprising:
pinning by a convergence network interface controller (CNIC), at least one of a plurality of memory pages, wherein said pinning prevents at least one of: a hypervisor and a guest operating system (GOS) from swapping said pinned said at least one of said plurality of memory pages.

2. The method according to claim 1, comprising dynamically pinning by said CNIC, said at least one of said plurality of memory pages.

3. The method according to claim 1, comprising allocating said at least one of said plurality of memory pages to at least one virtual machine.

4. The method according to claim 3, comprising determining whether said at least one virtual machine has access to reference said allocated at least one of said plurality of memory pages.

5. The method according to claim 1, wherein at least a portion of a plurality of addresses of said plurality of memory pages within a virtual input/out memory map are offset from at least a portion of a plurality of addresses within a physical input/output memory map.

6. The method according to claim 1, comprising checking an index of said hypervisor to validate mapping of said pinned said at least one of said plurality of memory pages.

7. The method according to claim 6, comprising preventing said swapping of said at least one of said plurality of memory pages by said hypervisor based on said validation.

8. The method according to claim 6, comprising updating said index of said hypervisor after said mapping of said pinned said at least one of said plurality of memory pages.

9. The method according to claim 1, comprising if said at least one of: said hypervisor and said GOS swaps out said at least one of said plurality of memory pages after said pinning, generating a page fault.

10. The method according to claim 1, comprising checking an index of said GOS to validate said mapping of said pinned said at least one of said plurality of memory pages.

11. The method according to claim 10, comprising preventing said swapping of said at least one of said plurality of memory pages by said GOS based on said validation.

12. A system for handling processing of network information, the system comprising:
a convergence network interface controller (CNIC) that enables pinning of at least one of a plurality of memory pages, wherein said pinning prevents at least one of: a hypervisor and a guest operating system (GOS) from swapping said pinned said at least one of said plurality of memory pages.

13. The system according to claim 12, wherein said CNIC enables dynamic pinning of said at least one of said plurality of memory pages.

14. The system according to claim 12, comprising circuitry that enables allocation of said at least one of said plurality of memory pages to at least one virtual machine.

15. The system according to claim 13, comprising circuitry that enables determining whether said at least one virtual machine has access to reference said allocated at least one of said plurality of memory pages.

16. The system according to claim 12, wherein at least a portion of a plurality of addresses of said plurality of memory pages within a virtual input/out memory map are offset from at least a portion of a plurality of addresses within a physical input/output memory map.

17. The system according to claim 12, comprising circuitry that enables checking an index of said hypervisor to validate mapping of said pinned said at least one of said plurality of memory pages.

18. The system according to claim 17, comprising circuitry that enables prevention of said swapping of said at least one of said plurality of memory pages by said hypervisor based on said validation.

19. The system according to claim 17, comprising circuitry that enables updating said index of said hypervisor after said mapping of said pinned said at least one of said plurality of memory pages.

20. The system according to claim 12, comprising circuitry that enables generation of a page fault, if said at least one of: said hypervisor and said GOS swaps out said at least one of said plurality of memory pages after said pinning.

21. The system according to claim 12, comprising circuitry that enables checking an index of said GOS to validate said mapping of said pinned said at least one of said plurality of memory pages.

22. The system according to claim 21, comprising circuitry that enables prevention of said swapping of said at least one of said plurality of memory pages by said GOS based on said validation.

* * * * *